United States Patent [19]
Feldbauer et al.

[11] Patent Number: 5,947,610
[45] Date of Patent: Sep. 7, 1999

[54] HYDRODYNAMIC THRUST BEARING ASSEMBLY

[75] Inventors: Stephen L. Feldbauer, Jackson Center, Pa.; Paul R. Ripple, Youngstown, Ohio

[73] Assignee: Danieli Wean, Youngstown, Ohio

[21] Appl. No.: 08/974,029

[22] Filed: Nov. 19, 1997

[51] Int. Cl.$^6$ .................................................. F16C 32/06
[52] U.S. Cl. ........................ 384/112; 384/107; 384/123; 384/120
[58] Field of Search .................................. 384/107, 111, 384/112, 113, 114, 120, 121, 123, 100, 322, 368, 371, 420, 313

[56] References Cited

U.S. PATENT DOCUMENTS

| | | | |
|---|---|---|---|
| 1,377,866 | 5/1921 | White . | |
| 2,516,199 | 7/1950 | Fry, Jr. ................................. | 384/313 X |
| 2,615,766 | 10/1952 | Wallace .................................... | 384/420 |
| 2,659,635 | 11/1953 | Dudley .................................... | 384/371 |
| 2,966,381 | 12/1960 | Menzel ................................. | 384/112 X |
| 3,942,847 | 3/1976 | Parr . | |
| 4,385,845 | 5/1983 | Hoshino ................................... | 384/123 |
| 4,427,308 | 1/1984 | Sandberg ................................. | 384/115 |
| 4,459,048 | 7/1984 | Stachuletz ............................... | 384/291 |
| 5,035,519 | 7/1991 | Aizawa et al. .......................... | 384/121 |
| 5,096,309 | 3/1992 | Nakasugi et al. ....................... | 384/112 |

*Primary Examiner*—Thomas R. Hannon
*Attorney, Agent, or Firm*—Armstrong, Westerman Hattori, McLeland & Naughton

[57] ABSTRACT

A hydrodynamic thrust bearing assembly for supporting a reduced diameter end portion of a rotating shaft includes a thrust button or plate having one end thereof abutting an end of the reduced diameter end portion to absorb axial forces exerted by the rotating shaft, and a hollow cylindrical bearing sleeve disposed around the reduced diameter end portion, and wherein the thrust button has a central aperture for introduction of a process fluid and a plurality of slots in the one end of the thrust button and communicating with the central aperture in the thrust button and with a helical groove formed in an interior surface of the sleeve.

11 Claims, 1 Drawing Sheet

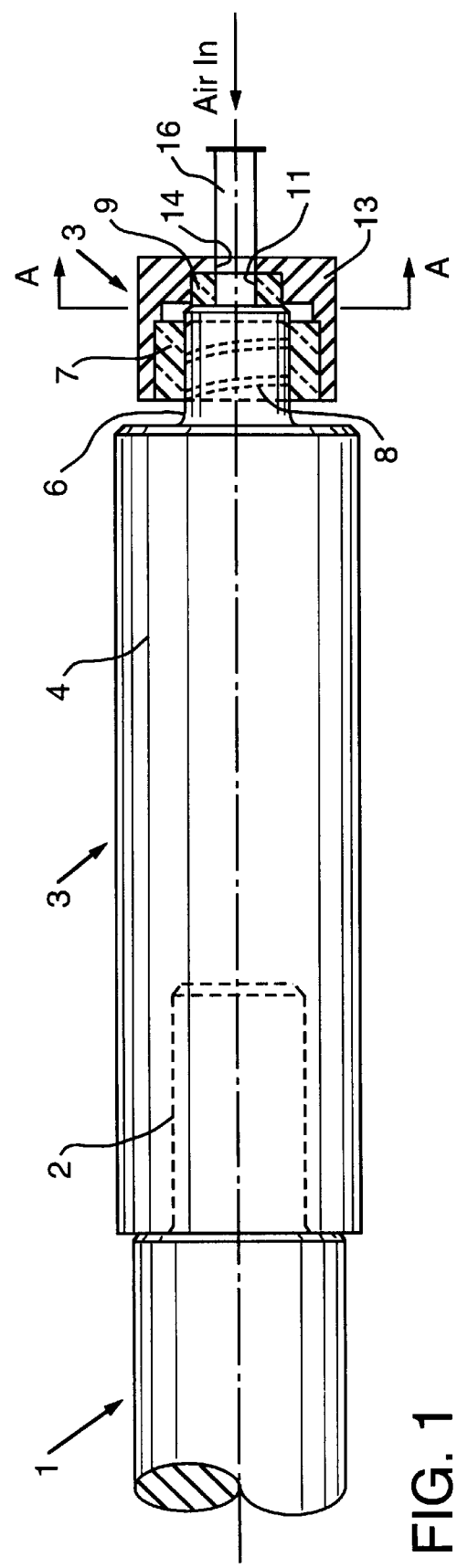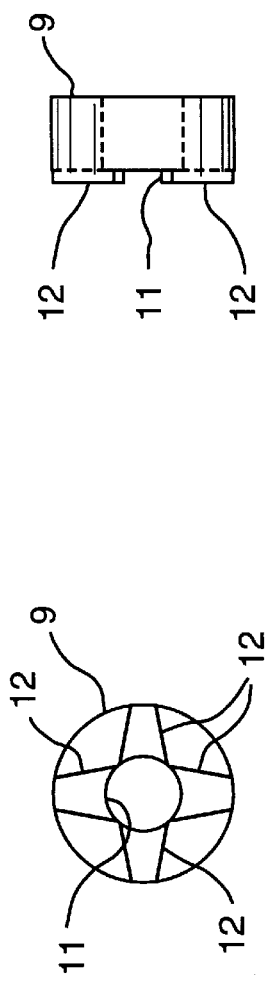

HYDRODYNAMIC THRUST BEARING ASSEMBLY

FIELD OF THE INVENTION

This invention relates to an improved bearing assembly including an internally grooved bearing sleeve and a slotted thrust plate or button, capable of accommodating both radial and axial forces such as are exerted on a rolling machine roll, for example a tension leveler roll, and replaces more expensive roller bearings.

DESCRIPTION OF THE PRIOR ART

Cylindrical sleeve bearings are known to the prior art, including such bearings having spiral grooves therein, or in a supported rotating shaft, for distribution of lubricating oil to the bearing, for example U.S. Pat. Nos. 1,377,866, wherein two-side surfaced troughs are cut, e.g. spirally, into a bearing b mounted about a rotating shaft c. Lubricating oil is introduced into grooves a and, from the grooves, into the abutting surfaces of bearing b and shaft c. In U.S. Pat. No. 3,942,847, an expandable, helically grooved ceramic member 1 is disposed between a rotating shaft and a cylindrical bearing and expands or contracts with changes in temperature. U.S. Pat. No. 4,427,308 shows a bearing assembly in which sprial grooves 54 are cut into a journal portion 48 of a shaft 46 mounted within a cylindrical bearing 36 provided with thrust washers 26 and wherein the grooves 54 serve to distribute lubricating oil between the rotating surfaces. U.S. Pat. No. 4,459,048 relates to an oil film bearing in a rolling mill and in which an oil film is maintained between a rotating bearing bushing 8 and a fixed bushing 12 by means of spirally disposed grooves 15 in the rotating bushing. U.S. Pat. No. 5,096,309 is directed to a hydrodynamic bearing system, for a laser printer or the like, in which a grooved shaft 1 is rotatably mounted in a sleeve 2 having an end plate 2b on which a resinous thrust plate 33 is mounted. An opening 7 and grooves 11 in the thrust plate enable the recirculating flow of a lubricating fluid through the grooves on the shaft 1 and between the shaft and the sleeve 2.

SUMMARY OF THE INVENTION

The bearing assembly of the invention is useful in the support of the necks of rolls in a rolling apparatus, especially the rolls of a tension leveler. For such purpose, there is provided a bearing subassembly and comprising a hollow cylindrical bearing sleeve mounted about the roll neck and provided, on an interior surface thereof, with helical grooves surrounding the roll neck. A cylindrical bearing thrust plate or button, preferably formed of a graphite or graphite/metal composition, and having a central aperture, abuts the reduced diameter end of the bearing body and is provided with a plurality of radially extending slots. These subassembly elements are held in place by means of a hollow cylindrical cap provided with an aperture communicating with the aperture of the bearing button and with the radial slots of the bearing button. A process fluid, for example air, is introduced through a connecting pipe to the cap aperture, and flows into the button aperture and thence through the radial slots of the button and into the helical grooves of the cylindrical bearing sleeve to cool and/or lubricate the abutting rotating surfaces.

Optionally, in order to accommodate short rolls or rolls of differing diameters, e.g. in the retrofitting of existing rolling machines, there may be provided a cylindrical roll-extension member, one end of which is secured, by appropriate known means, to the roll neck and the other end of which is of reduced diameter and about which the bearing assembly, specifically the hollow cylindrical bearing sleeve is mounted.

BRIEF DESCRIPTION OF THE DRAWINGS

FIG. 1 is a side or plan view of one form of the inventive bearing;

FIG. 2 is an end view of the thrust button taken along line A–A of FIG. 1, and

FIG. 3 is a side view of the button shown in FIG. 2.

DESCRIPTION OF PREFERRED EMBODIMENTS

In FIG. 1, the numeral 1 denotes generally a roll of a rolling apparatus, for example, a roll in a tension leveller, having a reduced diameter neck 2. In one form of the invention, there is connected to the neck 2 a roll-extension member comprising a cylindrical roll-extension member 4 having a reduced end portion 6 and rotatable with the roll 1. A bearing assembly denoted generally by the numeral 3 comprises a hollow cylindrical bearing sleeve 7 on an interior surface of which there is provided a helical or rifled groove 8 extending along the length of the sleeve 7 which is mounted, in a non-rotating manner, about the reduced end portion 6 of the rotatable body 4. Alternatively, the helical groove 8 may be formed on the reduced diameter end portion 6 of the member 4, or the member 4 may be eliminated and the bearing assembly similarly mounted about the roll neck. The latter would normally be the case in installation of new rolling machines.

An end thrust plate or button 9 is mounted against the end of the roll neck or of the reduced end portion 6 of the body 4 and is provided with a central aperture 11 and a plurality of straight grooves or slots 12 extending radially outwardly of the central aperture 11 (FIGS. 2 and 3).

Subassembly elements such as elements 7 and 9 preferably are made of a composition comprising graphite, a graphite/metal composition or combinations thereof, for example, particularly useful composition are those comprising a graphite/metal composition produced by Pure Carbon Company, a division of Morgan Advanced Materials and Technology, Inc., of St. Marys, Pa., and sold under the designations P-3310 and P-658 RCH.

A cylindrical cap 13, e.g. made of a suitable steel, and having a central aperture 14, holds in place the hollow cylindrical bearing sleeve 7 and the button 9 with the apertures 14 and 11 in registration with each other and, through aperture 11, communicating with radial slots 12 and helical groove 8.

In operation, a cooling and/or lubricating fluid, e.g. air, is introduced through a supply pipe 16 and flows through aperture 14, aperture 11, slots 12 and groove 8 thereby cooling the abutting surfaces of the cylindrical bearing sleeve 7 and the rotating roll neck 2 or the reduced diameter portion 6 of the member 4, and also the abutting surfaces of the button 9 and the end of the rotating roll neck or of the reduced diameter portion 6 of member 4.

A bearing design and construction as above shown and described effectively absorbs both radial and axial thrust forces from the associated roll and helps to reduce the thrust forces between those opposed rotating surfaces. Due to the effect of the applied process fluid in the manner shown and described, the present invention can replace much more expensive ball bearing assemblies which normally have a useful life of only about 200 hours.

What is claimed is:

1. A hydrodynamic thrust bearing assembly for supporting an end of a rolling machine roll having a reduced diameter neck at each end thereof, comprising:

a. a hollow, cylindrical bearing sleeve surrounding the roll neck the neck and interior of the sleeve each having a bearing surface with a helical groove formed in at least one of the bearing surfaces substantially coextensive with the length of the sleeve;

b. a bearing button disposed against an end surface of the roll neck and provided with a central aperture and a plurality of slots in communication with and extending radially outwardly of the central aperture of the button;

c. an apertured, generally cylindrical hollow cap mounted about the sleeve and the button for holding the sleeve and the button in place against the roll neck, and d. means to supply a process fluid to the bearing assembly whereby the fluid flows through the aperture of the cap, thence through the central aperture of the button, into the radial slots of the button, and thence into the helical groove.

2. A bearing according to claim 1, wherein the helical groove is formed on an exterior surface of the roll neck.

3. A bearing according to claim 1, wherein the sleeve and button are made of a material selected from the group consisting of graphite, a graphite/metal composition and combinations thereof.

4. A bearing assembly according to claim 1, wherein the helical groove is formed on the interior of the bearing sleeve.

5. A bearing assembly comprising means to connect the assembly to a rotatable roll and having a reduced diameter portion at one end thereof, a hollow cylindrical bearing sleeve mounted about the reduced diameter portion and having a helical groove formed in an interior surface thereof and extending substantially the length of the sleeve, a thrust button facing an end surface of the reduced diameter portion and having a central aperture and a plurality of slots in a surface of the button facing said end surface of the reduced diameter portion and extending radially outwardly of the central aperture of the button and communicating with the helical groove, apertured holding means surrounding the sleeve and button to secure the sleeve and button in place against the reduced diameter portion, and means to supply a process fluid to a fluid channel formed by the aperture in the holding means, the aperture in the button, the slots in the button and the helical groove in the sleeve.

6. A hydrodynamic thrust bearing assembly for supporting and absorbing axial and radial forces exerted by a rotating roll shaft, comprising an improved axial thrust button consisting of a cylinder having a central aperture connectable to a source of process fluid and disposable against an end surface of a rotating shaft and provided on one end thereof with a plurality of slots extending radially outwardly of the central aperture and adapted to distribute process fluid to abutting surfaces of the rotating shaft and said one end of the thrust button, further comprising a hollow cylindrical bearing sleeve disposed about the rotating shaft and having a helical groove formed in an interior surface of the sleeve and communicating with the slots in the thrust button to distribute process fluid between the interior surface of the sleeve and the rotating shaft.

7. A bearing assembly according to claim 6, wherein the thrust button and the sleeve are made of a material selected from the group consisting of graphite, a graphite/metal composition, and combinations thereof.

8. A bearing assembly according to claim 7, wherein the thrust button and the sleeve are made of a material comprising a graphite/metal composition.

9. A hydrodynamic thrust bearing assembly for supporting a reduced diameter end portion of a rotating shaft comprising a cylindrical thrust button having one end thereof abutting an end of the reduced diameter end portion to absorb axial forces exerted by the rotating shaft, and a hollow cylindrical bearing sleeve disposed around the reduced diameter end portion to absorb radial forces exerted by the rotating shaft, the thrust button having a central aperture for introduction of a process fluid and a plurality of slots in said one end of the thrust button and communicating with the central aperture in the thrust button and with a helical groove formed in an interior surface of the sleeve.

10. A method of cooling and/or lubricating a hydrodynamic thrust bearing disposed around a reduced diameter end portion of a rotating shaft, comprising introducing a process fluid into a centrally apertured thrust button having one end thereof disposed against one end of the reduced diameter end portion, flowing the fluid through the central aperture of the thrust button and radially outwardly therefrom through a plurality of slots in said one end of the thrust button thereby to cool and/or to lubricate said one end of the thrust button as the said one end of the reduced diameter end portion rotates thereagainst further comprising flowing the fluid exiting from the slots in the thrust button into a helical groove formed in an interior surface of a hollow cylindrical sleeve disposed around the reduced diameter portion and along substantially a length thereof thereby to cool and/or to lubricate the interior surface of the sleeve and an abutting exterior surface of the reduced diameter portion.

11. A method according to claim 10, further comprising forming the thrust button and the sleeve from a material comprising a graphite/metal composition.

\* \* \* \* \*